Figure 2:
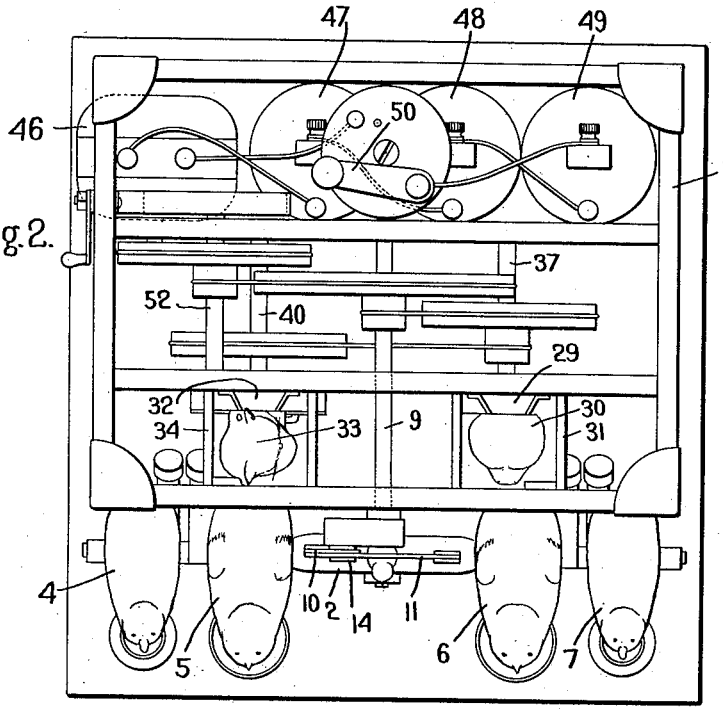

W. S. HASELTINE.
ADVERTISING NOVELTY.
APPLICATION FILED JULY 28, 1913.

1,095,111.

Patented Apr. 28, 1914.
2 SHEETS—SHEET 1.

Witnesses.
J. Morrill Fuller
Joseph D. Ashe

Inventor.
Walter S. Haseltine,
by Heard Smith & Tennant.
Atty's.

W. S. HASELTINE.
ADVERTISING NOVELTY.
APPLICATION FILED JULY 28, 1913.

1,095,111.

Patented Apr. 28, 1914.
2 SHEETS—SHEET 2.

Witnesses.
J. Morrill Fuller
Joseph D. Ashe.

Inventor.
Walter S. Haseltine,
by Heard Smith & Tennant.
Atty's.

UNITED STATES PATENT OFFICE.

WALTER S. HASELTINE, OF BOSTON, MASSACHUSETTS.

ADVERTISING NOVELTY.

1,095,111.

Specification of Letters Patent.　　Patented Apr. 28, 1914.

Application filed July 28, 1913.　Serial No. 781,590.

*To all whom it may concern:*

Be it known that I, WALTER S. HASELTINE, a citizen of the United States, residing at Boston, county of Suffolk, State of Massachusetts, have invented an Improvement in Advertising Novelties, of which the following description, in connection with the accompanying drawing, is a specification, like characters on the drawing representing like parts.

This invention relates to an advertising novelty of the type in which figures are given various movements simulating movements which are likely to be made by animals in natural life, and has for an object to provide a device which will attract and hold the attention, and which will provide amusement.

The device comprises figures representing helpless animals such as small chickens and ducks, a figure representing an animal of a protective nature, such as a dog, and an animal of a marauding nature such as a cat. The figures representing chickens and ducks are given movements to simulate the act of feeding, and the figures representing the dog and cat are made to come into view and to disappear intermittently as if respectively to guard and prey upon the small fowls. The operating mechanism may be so arranged that the cat will come into view first, then the dog, whereupon the cat will quickly disappear and is preferably so arranged that the dog will appear more frequently than the cat.

Figure 1:
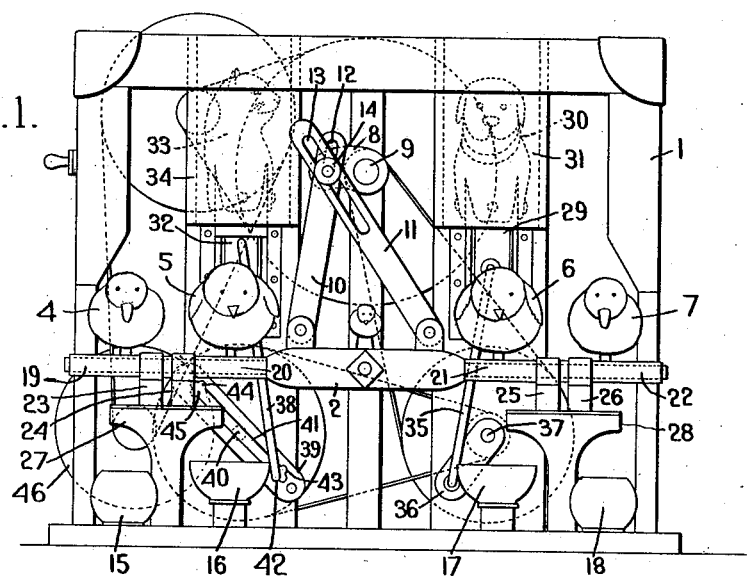
Figure 3:
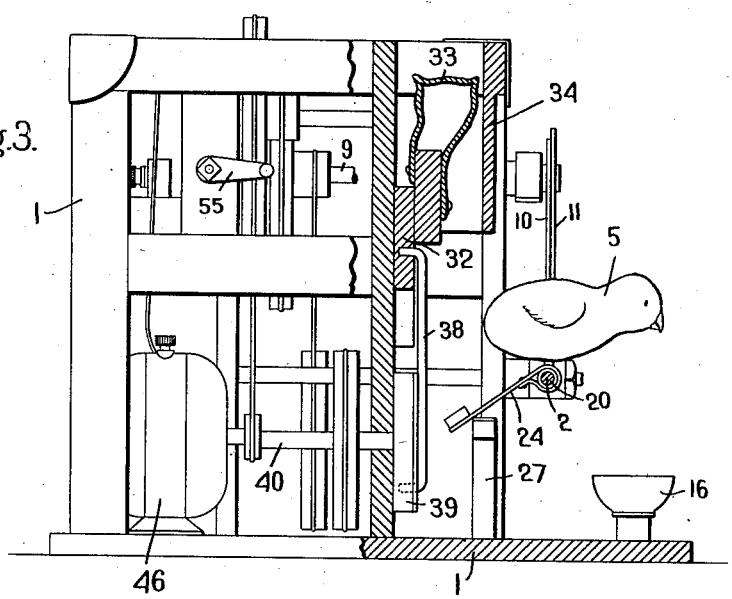
Figure 4:
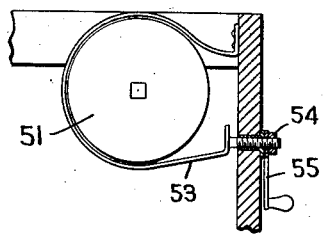

Referring to the drawings in which an embodiment of my invention is illustrated; Figure 1 is a front elevation of my device; Fig. 2 is a top plan view of the same; Fig. 3 is a view partly in section taken on the line 3—3 of Fig. 2, and Fig. 4 is a detail of the brake.

Referring to the drawings in detail, 1 represents a frame which is made as open as feasible in order that the working parts may be visible.

2 represents an oscillating support pivoted at 3 and on which are pivotally mounted figures 4, 5, 6, and 7, representing small ducks and chickens. I prefer to oscillate this support by means of a crank 8 secured to shaft 9 and to which the support is connected by a pair of links 10 and 11, slotted at 12 and 13 respectively to receive the crank pin 14. These slots are preferably proportioned to provide for a slight dwell at each extreme position of the support. If desired one link only may be used but I prefer the symmetrical arrangement shown even if one link is so slotted as to have no influence upon the motion of the support. 15, 16, 17 and 18 represent bowls which are so positioned that as the figures of the ducks and chickens are in their lowest positions, the heads thereof will be projected into the bowls to simulate the act of feeding from said bowls. Formed as parts of the figures 4, 5, 6, and 7 are sleeves 19, 20, 21, and 22 and weighted arms 23, 24, 25 and 26 respectively. The sleeves are pivotally mounted upon the oscillating support 2 in any suitable manner and the weighted arms project behind the figures and are engaged by cams 27 and 28. As a figure descends it will be given a tilting motion by the engagement of the arm with the cam.

29 represents a slide to which a figure 30 representing a dog is secured. A screen or box 31 is provided to conceal this figure when in its lowest position, but as the slide is raised, the figure appears above the box and seems to be guarding the chickens and ducks. To a slide 32 is secured a figure 33 representing a cat and in its lowest position this figure is concealed from view in the box 34 which is similar to the box 31, and similarly, as the slide 32 is raised the figure 33 appears above the box, preferably being positioned to face the figure representing the dog. The slide 29 is controlled by a connecting rod 35 connected to an ordinary crank 36 secured to the shaft 37. The slide 32 is controlled by a connecting rod 38 which is operated by a crank 39 secured to a shaft 40. This crank 39 is slotted as shown at 41, the slot being considerably wider at each end to form notches 42, 43, 44 and 45. As the crank 39 rotates, the end of the connecting rod, which projects into the slot, catches in one of these notches and is thereby raised until in approximately its highest position, at which time the end of the connecting rod slips out of the notch and falls to the lower end of the slot, whereby the figure 33 suddenly disappears from view.

If desired a cam may be provided on the end of the connecting rod to engage corresponding parts on the crank and insure disengagement in the proper position. I find this unnecessary however, and therefore have not illustrated such a device.

The shafts 9, 37 and 40 may be operated by any suitable mechanism. For this purpose I have shown a motor 46, dry cells 47, 48, and 49 with a switch 50 connected in series with the motor and belt gearing connecting the motor and said shafts. As this gearing is of common well known construction, and as the specific form thereof is not material to this invention, I shall not describe it in detail.

I provide a brake to control the speed of the gearing in the form of a brake wheel 51 secured to the shaft 52 and a brake band 53 encircling the brake wheel. A nut 54 having a crank 55 secured thereto controls the brake band.

Obviously various modifications may be devised without departing from the scope of my invention as outlined in the annexed claims.

Having described my invention, what I claim as new and desire to secure by Letters Patent is:—

1. An advertising novelty comprising pivoted figures mounted for vertical movement, cams positioned to engage said figures and cause them to tilt during their vertical movement and means for giving vertical movement to said figures whereby the figures simultaneously move vertically and tilt to simulate the act of feeding.

2. An advertising novelty comprising an oscillating support, figures pivotally mounted upon said oscillating support means for oscillating said support to move said figures bodily, and for causing the figures to tilt relative to the support, whereby said figures may be made to simulate the act of feeding.

3. An advertising novelty comprising an oscillating support, figures pivotally mounted on said support, objects representing food receptacles mounted in position to be approached by said figures during the movement of the oscillating support, means for oscillating the support and tilting the figures, whereby the figures will be made to simulate the act of feeding from said bowls.

4. An advertising novelty comprising a vertically movable support, a figure representing a helpless animal pivotally mounted upon said vertically movable support, a reciprocating support, a figure representing an animal of another kind mounted upon said reciprocating support, and means for simultaneously moving said vertically movable support and said reciprocating support, whereby the figure representing a helpless animal is caused to move vertically, and also to tilt simulating the act of feeding, and the figure representing the second mentioned animal is caused to move into view and away intermittently.

5. An advertising novelty comprising a bodily movable support, a figure representing a helpless animal mounted on said support, means to engage said figure and give it a tilting movement in addition to its bodily movement, whereby said figure simulates the act of feeding, a second bodily movable support, a figure representing an animal of another kind mounted on said second support, and means to give bodily movement to both of said supports.

6. An advertising novelty comprising a vertically movable support, a figure representing a helpless animal pivotally mounted thereon, means to engage said figure during the vertical movement of the support to cause it to tilt on the support and simulate the act of feeding, a screen located adjacent said support, a slide movable behind said screen and carrying a figure representing an animal of a protective nature, and means for simultaneously reciprocating said slide and said support, whereby the figure representing the animal of a protective nature is intermittently projected beyond the screen during the movement of the figure carried by the support.

7. An advertising novelty comprising a vertically movable support, a figure representing a helpless animal pivotally mounted thereon, means to engage said figure during the vertical movement of the support, to cause it to tilt on the support and simulate the act of feeding, a screen located adjacent said support, a slide movable behind said screen and carrying a figure representing an animal of a protective nature, and means for simultaneously reciprocating said slide and said support, whereby the figure representing the animal of a protective nature is intermittently projected beyond the screen during the movement of the figure carried by the support, a second screen located adjacent the said support, a slide movable behind said second screen and carrying a third figure representing an animal of a marauding nature and means for occasionally moving the said second slide to cause the third figure to be projected beyond its screen and to be suddenly returned.

8. An advertising novelty comprising an oscillating support, figures representing helpless animals pivotally mounted upon said oscillating support, cams positioned to be engaged by these figures during the oscillatory movement of the support to cause said figures to be tilted upon the support, a movable slide, a figure representing an animal of a protective nature mounted upon said movable slide, a crank, a connecting rod between said crank and said slide, a second slide, a figure representing an animal of a marauding nature mounted upon said second slide, a slotted crank, a connecting rod pivotally secured to said second slide, and movable in the slot of said slotted crank, and means to simultaneously operate the oscillating support and to rotate the cranks, whereby the figures representing the helpless animals will be made to simulate the act of feeding, and the figures representing the protecting animal and the marauding animal will be made to appear and disappear intermittently.

In testimony whereof, I have signed my name to this specification, in the presence of two subscribing witnesses.

WALTER S. HASELTINE.

Witnesses:
MAURICE B. LANDERS,
THOMAS J. DRUMMOND.

Copies of this patent may be obtained for five cents each, by addressing the "Commissioner of Patents, Washington, D. C."